US011507587B2

(12) United States Patent
Getson et al.

(10) Patent No.: US 11,507,587 B2
(45) Date of Patent: *Nov. 22, 2022

(54) ADVANCED SYSTEMS AND METHODS FOR ALLOCATING CAPITAL TO TRADING STRATEGIES FOR BIG DATA TRADING IN FINANCIAL MARKETS

(71) Applicant: Capitalogix IP Owner, LLC, Coppell, TX (US)

(72) Inventors: Howard M. Getson, Coppell, TX (US); Sean Vallie, Lantana, TX (US); Adam Peterson, Frisco, TX (US); Kelvin Rodriguez, Coppell, TX (US)

(73) Assignee: Capitalogix IP Owner, LLC, Coppell, TX (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/805,542

(22) Filed: Feb. 28, 2020

(65) Prior Publication Data

US 2020/0201871 A1 Jun. 25, 2020

Related U.S. Application Data

(63) Continuation of application No. 14/642,577, filed on Mar. 9, 2015, now Pat. No. 10,795,893.

(Continued)

(51) Int. Cl.
*G06N 5/04* (2006.01)
*G06F 16/2457* (2019.01)
(Continued)

(52) U.S. Cl.
CPC ......... *G06F 16/24578* (2019.01); *G06N 3/02* (2013.01); *G06Q 40/00* (2013.01); *G06Q 40/04* (2013.01); *G06N 5/04* (2013.01)

(58) Field of Classification Search
None
See application file for complete search history.

(56) References Cited

U.S. PATENT DOCUMENTS 5,761,442 A * 6/1998 Barr .................. G06Q 40/02
705/36 R
6,578,068 B1 6/2003 Bowman-Amuah
(Continued)

FOREIGN PATENT DOCUMENTS

CN 101276454 A 10/2008
CN 102136099 A 7/2011
(Continued)

OTHER PUBLICATIONS

Koskinen, et al., Exploring Algorithms for Automated FX Trading—Constructing a Hybrid Model, Seminar on Case Studies in Operations Research, Helsinki University of Technology, 2008, pp. 1-50 (Year: 2008).*

(Continued)

*Primary Examiner* — Wilbert L Starks
(74) *Attorney, Agent, or Firm* — Carr & Ferrell LLP (57) ABSTRACT

Exemplary systems and methods for allocating capital to trading strategies may include a means for generating a virtual machine for a trading strategy in a historical server, a means for obtaining historical performance data for the trading strategy from the historical server, a means for transforming the historical performance data into metrical data, a means for transforming the historical performance data and metrical data into a neural network usable data set, a means for creating a neural network base, and a means for forming a neural network.

20 Claims, 4 Drawing Sheets

Related U.S. Application Data (60) Provisional application No. 61/949,938, filed on Mar. 7, 2014.

(51) Int. Cl.
  *G06Q 40/04* (2012.01)
  *G06N 3/02* (2006.01)
  *G06Q 40/00* (2012.01)

(56) References Cited

U.S. PATENT DOCUMENTS

| | | | |
|---|---|---|---|
| 6,735,580 | B1 | 5/2004 | Li et al. |
| 7,644,863 | B2 | 1/2010 | Chen et al. |
| 7,805,344 | B2 | 9/2010 | Smith |
| 7,882,014 | B2 | 2/2011 | Shapiro et al. |
| 8,250,102 | B2 * | 8/2012 | Madhavarapu ......... G06F 16/93 707/794 |
| 8,285,658 | B1 | 10/2012 | Kellas-Dicks et al. |
| 8,442,885 | B1 | 5/2013 | Carrie et al. |
| 8,626,522 | B2 | 1/2014 | Greenwood |
| 9,529,634 | B1 | 12/2016 | Hsu et al. |
| 9,626,503 | B2 | 4/2017 | Jung et al. |
| 9,934,000 | B2 | 4/2018 | Sherwood et al. |
| 10,387,679 | B2 | 8/2019 | Getson et al. |
| 10,423,800 | B2 | 9/2019 | Getson et al. |
| 10,795,893 | B2 | 10/2020 | Getson et al. |
| 10,824,753 | B2 | 11/2020 | Getson et al. |
| 11,366,816 | B2 | 6/2022 | Getson et al. |
| 11,403,416 | B2 | 8/2022 | Getson et al. |
| 2002/0095400 | A1 | 7/2002 | Johnson et al. |
| 2003/0046159 | A1 | 3/2003 | Ebrahimi et al. |
| 2003/0217129 | A1 | 11/2003 | Knittel et al. |
| 2004/0205110 | A1 | 10/2004 | Hinshaw |
| 2005/0203892 | A1 | 9/2005 | Wesley et al. |
| 2006/0101062 | A1 | 5/2006 | Godman et al. |
| 2007/0288466 | A1 | 12/2007 | Bohannon et al. |
| 2009/0012760 | A1 | 1/2009 | Schunemann |
| 2009/0125370 | A1 | 5/2009 | Blondeau et al. |
| 2011/0153445 | A1 | 6/2011 | Huang et al. |
| 2011/0185063 | A1 | 7/2011 | Head et al. |
| 2011/0246298 | A1 | 10/2011 | Williams et al. |
| 2012/0023035 | A1 | 1/2012 | Kuhnle et al. |
| 2012/0257820 | A1 | 10/2012 | Sanghvi et al. |
| 2012/0259762 | A1 | 10/2012 | Tarighat et al. |
| 2012/0324446 | A1 | 12/2012 | Fries et al. |
| 2013/0024395 | A1 | 1/2013 | Clark et al. |
| 2013/0138577 | A1 | 5/2013 | Sisk |
| 2013/0211990 | A1 | 8/2013 | Zhong |
| 2013/0325918 | A1 | 12/2013 | Sherwood et al. |
| 2014/0052421 | A1 | 2/2014 | Allen et al. |
| 2014/0122480 | A1 | 5/2014 | Jung et al. |
| 2014/0215033 | A1 | 7/2014 | Ravichandran et al. |
| 2015/0127628 | A1 | 5/2015 | Rathod |
| 2015/0254556 | A1 | 9/2015 | Getson et al. |
| 2015/0254765 | A1 | 9/2015 | Getson et al. |
| 2015/0302303 | A1 | 10/2015 | Hakim |
| 2016/0021157 | A1 | 1/2016 | Duerring |
| 2016/0335532 | A1 | 11/2016 | Sanghavi et al. |
| 2017/0018034 | A1 | 1/2017 | Wainman et al. |
| 2017/0180272 | A1 | 6/2017 | Bernath |
| 2018/0004969 | A1 | 1/2018 | Getson et al. |
| 2018/0196964 | A1 | 7/2018 | Getson et al. |
| 2019/0340380 | A1 | 11/2019 | Getson et al. |
| 2019/0354722 | A1 | 11/2019 | Getson et al. |
| 2021/0049293 | A1 | 2/2021 | Getson et al. |

FOREIGN PATENT DOCUMENTS

| | | |
|---|---|---|
| CN | 102333126 A | 1/2012 |
| CN | 102393894 A | 3/2012 |
| CN | 102523166 A | 6/2012 |
| CN | 102663649 A | 9/2012 |
| CN | 102713849 A | 10/2012 |
| CN | 103412792 A | 11/2013 |
| CN | 103493008 A | 1/2014 |
| CN | 106462794 A | 2/2017 |
| CN | 106462795 A | 2/2017 |
| CN | 109804360 A | 5/2019 |
| CN | 110383245 A | 10/2019 |
| CN | 106462795 B | 5/2020 |
| CN | 111488975 A | 8/2020 |
| ID | 202000594 A | 3/2020 |
| SG | 11201607309 T | 9/2019 |
| SG | 11201607320 T | 10/2019 |
| WO | WO2013082119 A1 | 6/2013 |
| WO | WO2015134991 A1 | 9/2015 |
| WO | WO2015134992 A1 | 9/2015 |
| WO | WO2018005170 A1 | 1/2018 |
| WO | WO2018128998 A1 | 7/2018 |

OTHER PUBLICATIONS

Orrantia, DMForex: A Data Mining Application to Predict Currency Exchange Rates and Trends, Masters Thesis, 2012, pp. 1-67 (Year: 2012).*

Koskinen et al., "Exploring Algorithms for Automated FX Trading—Constructing a Hybrid Model," Seminar on Case Studies in Operations Research, Helsinki University of Technology, 2008, pp. 1-50.

Akhtar et al., Distributed Online Banking, retrieved from <http://www.micsymposium.org/mics_2004/Akhtar.pdf>, 2004, pp. 1-14.

"International Search Report and Written Opinion of the International Searching Authority," Patent Cooperation Treaty Application No. PCT/US2017/038375, dated Sep. 12, 2017, 7 pages.

"Office Action," Singapore Patent Application No. 11201607320T, dated Nov. 15, 2017, 8 pages.

"Office Action," Singapore Patent Application No. 11201607309T, dated Nov. 15, 2017, 8 pages.

Lo, Andrew W. et al., "Foundations of Technical Analysis: Computational Algorithms, Statistical Inference, and Empirical Implementation," The Journal of Finance, vol. 55 No. 4, Aug. 2000, pp. 1705-1765.

Percival, Scott, "Backtesting and Data Mining," trade2win.com [online], Dec. 23, 2007 [retrieved on Nov. 20, 2017], Retrieved from the Internet: <URL:https://web.archive.org/web/20130601132145/http://www.trade2win.com/articles/1258-backtesting-data-mining>, 8 pages.

"International Search Report" and "Written Opinion of the International Searching Authority," Patent Cooperation Treaty Application No. PCT/US2018/012111, dated Mar. 26, 2018, 8 pages.

"Office Action," Singapore Patent Application No. 11201607309T, dated Jun. 12, 2018, 5 pages.

"Office Action," Singapore Patent Application No. 11201607320T, dated Jun. 8, 2018, 4 pages.

"Office Action," Chinese Patent Application No. 201580012482.5, dated Jun. 21, 2018, 7 pages (16 pages including translation).

Cui et al., "A nerve net invading detect model research based on inerratic detect by virtual machine running," Computer Science and Technique Department of Yunnan Police Officer Academy, Yunnan Kunming, 650223, China, Jun. 30, 2007, pp. 109-112.

"Office Action," Chinese Patent Application No. 201580012465.1, dated Jun. 21, 2018, 3 pages [5 pages including translation].

Rohit et al., "Large Data and Computation in a Hazard Map Workflow Using Hadoop and Neteeza Architectures," ACM, Nov. 18, 2013, pp. 7-12.

"Office Action," Chinese Patent Application No. 201580012482.5, dated Jan. 31, 2019, 4 pages (9 pages including translation).

"Office Action," Chinese Patent Application No. 201580012465.1, dated Feb. 1, 2019, 6 pages (12 pages including translation).

Orrantia, Jorge, "DMForex: A Data Mining Application to Predict Currency Exchange Rates and Trends," California State University Northridge Masters Thesis, 2012, pp. 1-67.

"Notice of Allowance" Singapore Patent Application No. 11201607309T, dated May 8, 2019, 6 pages.

"Notice of Allowance" Singapore Patent Application No. 11201607320T, dated May 15, 2019, 5 pages.

"Office Action," Chinese Patent Application No. 201580012465.1, dated Aug. 19, 2019, 6 pages (14 pages including translation).

(56) References Cited

OTHER PUBLICATIONS

"Office Action," Indonesian Patent Application No. P00201606735, dated Aug. 19, 2019, 2 pages (4 pages including translation).
"Office Action," Indonesian Patent Application No. P00201606736, dated Aug. 15, 2019, 2 pages (4 pages including translation).
"Office Action," Chinese Patent Application No. 201580012482.5, dated Sep. 2, 2019, 5 pages.
"International Search Report" and "Written Opinion of the International Searching Authority," Patent Cooperation Treaty Application No. PCT/US2015/019509, dated Jun. 24, 2015, 12 pages.
"International Search Report" and "Written Opinion of the International Searching Authority," Patent Cooperation Treaty Application No. PCT/US2015/019514, dated Jun. 19, 2015, 10 pages.
"Notice of Allowance" Chinese Patent Application No. 201580012482.5, dated Feb. 3, 2020, 4 pages (6 pages including translation).
"Office Action," Singapore Patent Application No. 11201811518U, dated Mar. 24, 2020, 6 pages.
"Office Action," Chinese Patent Application No. 201580012465.1, dated Apr. 23, 2020, 6 pages.
"Office Action," Singapore Patent Application No. 11201906224R, dated Aug. 20, 2020, 5 pages.
"Office Action," Chinese Patent Application No. 201580012465.1, dated Nov. 5, 2020, 10 pages (18 pages including translation).
Liu, Jiyuan, "Natural Disasters and Spatial Information System", Sep. 30, 2013, 33 pages.
"Office Action", Singapore Patent Application No. 10201906293Y, dated Feb. 9, 2021, 24 pages.
"Notice of Allowance" China Patent Application No. 201580012465.1, dated Mar. 26, 2021, 2 pages [4 pages with translation].
Pan et al., "An Intelligent Agent Framework for Enterprise Integration", IEEE Transactions on Syystems, Man, and Cybernetics, vol. 211, No. 6, 1991, pp. 1391-1408.
Ezzeddine et al., "An intelligent Framework for the Cooperation in the Extended Enterprise Environment", IEEE, 2011, pp. 379-384.
Podpora et al., "Intelligent Real-Time Adaptation for Power Efficiency in Sensor Networks", IEEE Sensors Journal, vol. 8, No. 12, Dec. 2008, pp. 2066-2073.
Merdan et al., "Intelligent-Agent based Approach for Assembly Automation", E Conference on Soft Computing in Industrial Applications, Jun. 2008, pp. 13-19.
Yan, "The Research of Active Data Warehouse Based on Multi-agent", IEEE, 2012, pp. 1-4.

* cited by examiner

ADVANCED SYSTEMS AND METHODS FOR ALLOCATING CAPITAL TO TRADING STRATEGIES FOR BIG DATA TRADING IN FINANCIAL MARKETS

CROSS-REFERENCE TO RELATED APPLICATIONS

The present continuation application claims the benefit and priority of U.S. Non-Provisional patent application Ser. No. 14/642,577 filed on Mar. 9, 2015, and issued as U.S. Pat. No. 10,795,893 on Oct. 6, 2020, and titled "Systems and Methods for Allocating Capital to Trading Strategies for Big Data Trading in Financial Markets," which in turn claims the benefit and priority of U.S. Provisional Application Ser. No. 61/949,938 filed on Mar. 7, 2014, titled "Systems and Methods for Big Data Trading in Financial Markets," all of which are hereby incorporated by reference.

The present application is related to U.S. Non Provisional application Ser. No. 14/642,569, filed on Mar. 9, 2015, titled "Secure Intelligent Networked Systems," which is hereby incorporated by reference.

FIELD OF THE TECHNOLOGY

The embodiments disclosed herein are related to systems and methods for using big data analysis for trading in financial markets.

SUMMARY

Provided herein are exemplary systems and methods for allocating capital to trading strategies, including generating a virtual machine by a master virtual machine server for a trading strategy in a historical server, obtaining historical performance data for the trading strategy from the historical server, transforming by the virtual machine the historical performance data into metrical data, transforming by the virtual machine the historical performance data and metrical data into a neural network usable data set, creating by the virtual machine a neural network base, and forming by the virtual machine a neural network.

Exemplary systems and methods may further comprise training by the virtual machine a neural network for one or more data points, calculating by the virtual machine an error rate for the one or more data points until the error rate stops converging or cannot converge, saving by the virtual machine the neural network, testing by the virtual machine the saved neural network against updated metrical and historical data, training by the virtual machine the saved neural network, saving by the virtual machine the neural network as a binary object, transmitting by the virtual machine the binary object to the historical server, activating by a fusion server the neural network, obtaining by the fusion server historical metrical and historical performance data, calculating by the fusion server a confidence value, determining by the fusion server whether to execute a trade, performing by the fusion server a survey, determining by the fusion server an order to send to an exchange, sending by the fusion server the order to the exchange and updating by the fusion server to reflect an executed order.

An exemplary system for allocating capital to trading strategies may include a means for generating a virtual machine for a trading strategy in a historical server, a means for obtaining historical performance data for the trading strategy from the historical server, a means for transforming the historical performance data into metrical data, a means for transforming the historical performance data and metrical data into a neural network usable data set, a means for creating a neural network base, and a means for forming a neural network. According to further exemplary embodiments, the system may include a means for training by the neural network for one or more data points, a means for calculating an error rate for the one or more data points until the error rate stops converging or cannot converge, a means for saving the neural network, a means for testing the saved neural network against updated metrical and historical data, a means for training the saved neural network, a means for saving the neural network as a binary object, a means for transmitting the binary object to the historical server, a means for activating the neural network, a means for obtaining historical metrical and historical performance data, a means for calculating a confidence value, a means for determining whether to execute a trade, a means for performing a survey, a means for determining an order to send to an exchange, a means for sending the order to the exchange, and a means for updating to reflect an executed order.

DETAILED DESCRIPTION OF EXEMPLARY EMBODIMENTS

Figure 1A:
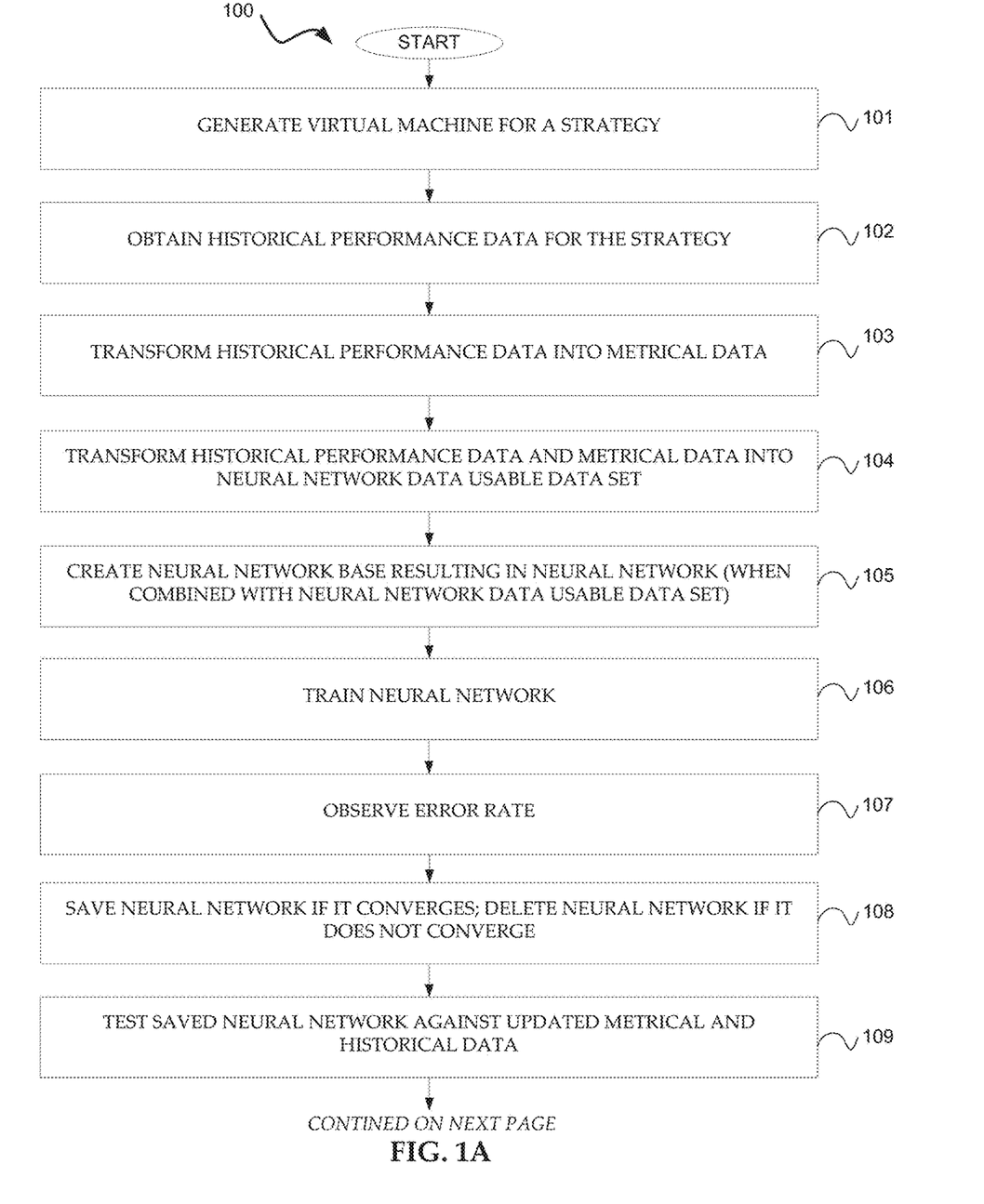
FIGS. 1A-1C are a flowchart of an exemplary method 100 for allocating capital to trading strategies.
Figure 1B:
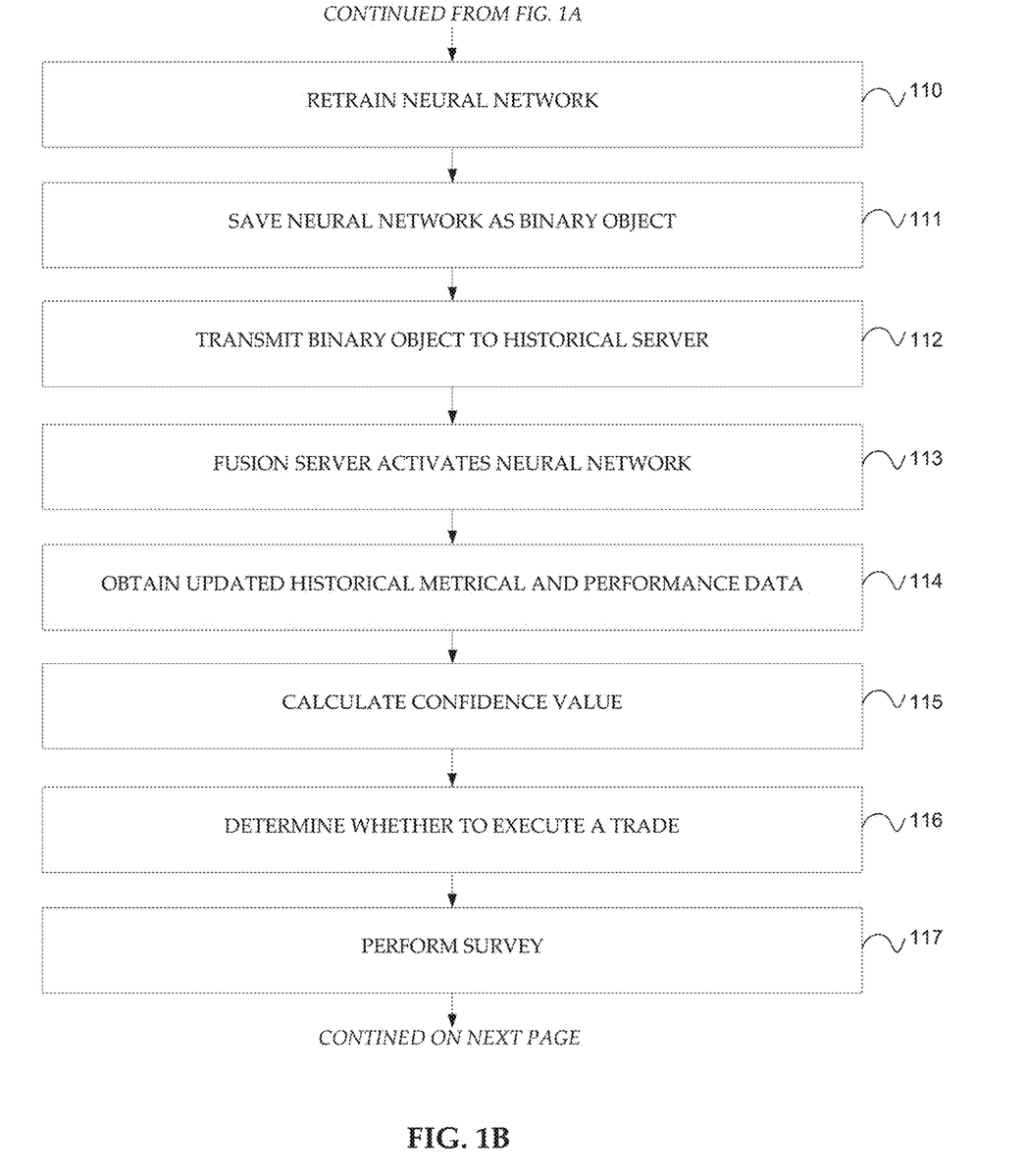
Figure 1C:
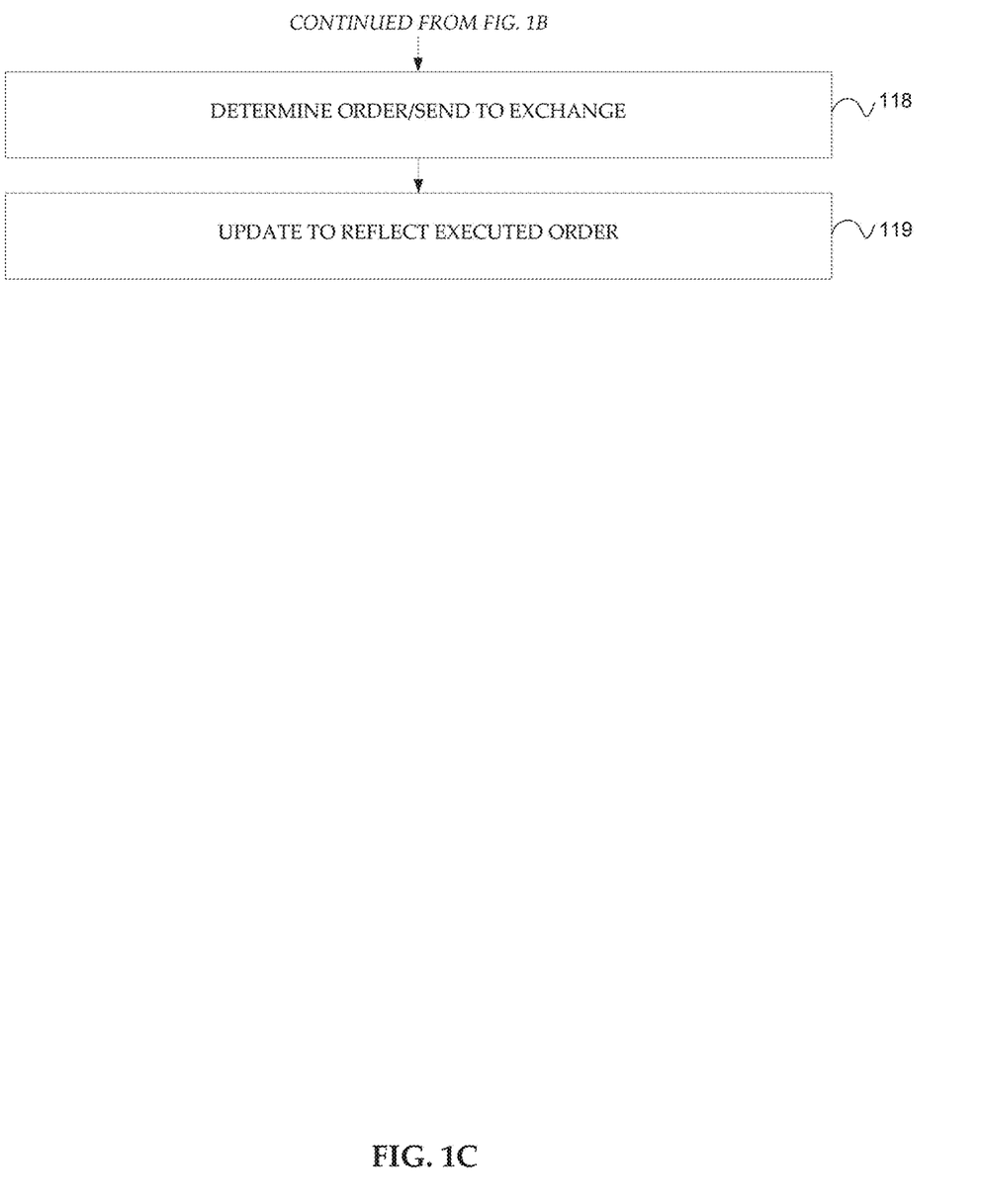

FIGS. 1A-1C are a flowchart of an exemplary method for allocating capital to trading strategies.

At step 101, a virtual machine is generated by a master virtual machine server for a trading strategy in a historical server.

According to various exemplary embodiments, a virtual machine may comprise an emulation of a particular computer system. Virtual machines operate based on the computer architecture and functions of a real or hypothetical computer, and their implementations may involve specialized hardware, software, or a combination of both.

In certain exemplary embodiments, a master virtual machine server may comprise a single server responsible for generating all of or most of the herein described virtual machines.

A historical server according to some exemplary embodiments may comprise trading algorithms, trading strategies or "bots" that meet minimum standards as stored in a database and/or in a data warehouse.

For example, a cloud manager may be a custom application that manages trading strategies or algorithms. The cloud manager is configured to the cluster of cloud computing instances for processing large amounts of data. The cloud manager serves as the user interface to handle the ordering and cancelling of virtual computing instances. Additionally, the cloud manager may allow for detailed customization of the virtual machines. For example, Random Access Memory ("RAM"), processor speed, number of processors, network details, security/encryption, and/or memory may be detailed for each virtual machine and/or all virtual machines. Once the cluster of cloud computing instances is ordered and running, the cloud manager is "listening" for idle machines and "assigning" any idle machine a trading strategy for analyzing.

A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

For example, from a $3^{rd}$ party cloud provider, an order is placed to create virtual machine (vm) based of an image of a stored template vm with required specifications and name it "VM1."

At step 102, each virtual machine generated at step 101 obtains historical performance data for its respective strategy from the historical server.

Historical performance data may include price and volume data at any previous point in time for a tradable item in any market or exchange.

At step 103, each virtual machine transforms the historical performance data into metrical data.

Metrical data includes total profit over 1 year, percentage of profitable trades over a time period, how much was gained or lost in each trade, percentage of profitable trades in a bear or bull market, correlation to other indexes, ratio of profitable trades to cover largest loss, etc. For instance, % of profitable trades (=profitable trades/total number of trades) may be used as metrical data.

At step 104, each virtual machine transforms the historical performance data and metrical data into a neural network usable data set.

In some exemplary embodiments, a neural network usable data set comprises an aggregation of data points organized into one or more sets.

For example, for a particular time period, such as each day (or each minute, hour, month, year(s), decades, bull cycle, bear cycle, etc.), for any particular tradable item (for example, gold), the historical data and metrical data will be grouped together as a data set. Thus, for the tradable item of gold, in a particular market or exchange, for a particular calendar day, one may have a neural network usable data set comprising the historical data of $300 per ounce, volume traded, day high price and day low price, tick by tick changes in said historical data and the metrical data of year to date price performance of 25%.

At step 105, each virtual machine creates a neural network base. The neural network base, along with the neural network usable data set created at step 104, forms a neural network.

Creating a neural network base, according to some exemplary embodiments, includes processing a layer of input data and then processing that data algorithmically to compare the output of the algorithms against known output.

A neural network base may comprise of set of algorithms used to approximate against data inputs. These algorithms are able to store tested values within itself and store an error rate.

A neural network may comprise a neural network base and its underlying algorithms in tandem with a neural network usable data set. The neural network usable data set may function as a data feeder for the neural network base to calculate and/or otherwise interact with.

In various exemplary embodiments, feeding of a data point may be performed by the neural network iteratively requesting to process the next data point in the usable data set.

Data points, according to many exemplary embodiments, may include but is not limited to metrical data and historical data that the neuro network has access to as part of its useable data set.

At step 106, each virtual machine trains its respective neural network (and the neural network learns) for the one or more data points.

The neural network base, in some exemplary embodiments, uses the data points to systematically approximate solutions to the internal algorithms and then outputs an error rate for each (new) data point of the useable data set.

According to some embodiments, a neural network base comprises various algorithms designed to interact with a data set in order to determine if a particular trading strategy should be employed during the next trading period. For example, the neural network base may determine a progressively rising price pattern for a particular tradable item when a particular trading strategy is employed. Continuing this example, suppose the particular trading strategy resulted in profits in trading gold for the last three trading periods comprising $300, $325 and $350. The neural network base will determine there is a rising profit pattern and indicate that the particular strategy should be employed for the next trading period.

Training, according to certain exemplary embodiments, includes improving the ability of a neural network to generalize outputs and responses through use of "noisy" data that includes small random variations from previously learned solutions. Note that an over trained network gets better at matching the training set of patterns to the desired output, but it may do a poorer job of generalization.

An example of training by each virtual machine: Imagine a strategy that involves a teacher that is smarter than the network itself. For example, facial recognition. The teacher shows the network a bunch of faces, and the teacher already knows the name associated with each face. The network makes its guesses, then the teacher provides the network with the answers. The network can then compare its answers to the known "correct" ones and make adjustments according to its errors.

Most of the algorithms used in training artificial neural networks employ some form of gradient descent, using backpropagation to compute the actual gradients. This is done by taking the derivative of the cost function with respect to the network parameters and then changing those parameters in a gradient-related direction. Evolutionary methods, gene expression programming, simulated annealing, expectation-maximization, non-parametric methods and particle swarm optimization are methods for training neural networks.

For example, a neural network for handwriting recognition is defined by a set of input neurons which may be activated by the pixels of an input image. After being weighted and transformed by a function (determined by the network's designer), the activations of these neurons are then passed on to other neurons. This process is repeated until finally, an output neuron is activated. This determines which character was read.

Like other machine learning methods—systems that learn from data-neural networks have been used to solve a wide variety of tasks that are hard to solve using ordinary rule-based programming, including computer vision and speech recognition.

In the present case, a strategy with a known historical performance is being run in real time to determine if past performance (and/or under what conditions) will result in the same or a better future performance.

An example of step 106, with reference to step 105, where the particular trading strategy resulted in profits in trading gold for the last three trading periods respectively comprising $300, $325 and $350, the neural network running on the virtual machine predicted a profit for the next trading period of $375. In the next trading period, however, the actual profit turned out to be $360. Accordingly, the neural network will adjust downward (i.e. learn from the virtual machine) the projected profit for the day following the day when the actual profit was $360.

At step 107, an error rate for the one or more data points is observed until the error rate stops converging or cannot converge.

In some exemplary embodiments, an error rate is defined as closeness of the approximation of the neural network base where 0 is an exact approximation and greater than or equal to 1 is an incorrect network. Where the error rate is updated for each (new) data point.

Stopping of the converging of the error rate or the inability of the error rate to converge may be observed if the previous error rate is larger than the currently calculated error rate or the error rate has not changed.

An example of step 107 may include providing a solution to the neuro network where the first iteration produces an error rate of 0.01. The second iteration produces an error rate of 0.001. The third iteration produces an iteration of 0.0001. However, the fifth iteration produces an error rate of 0.01—which is larger than the previously calculated error rate.

Another example of step 107, with reference to steps 105 and 106, when the profit for trading gold using a particular trading strategy produced profits of $300, $325, $350 and predicted a profit of $375, when the profit actually turned out to be $365, an error rate of ($375-$365=$10)/(projected profit=$25)=40% results. Continuing this example, the error rate will continue to be calculated for subsequent trading days until the error rates stops going down.

At step 108, if the observed error rate does not converge, the neural network is dropped and marked as "unusable" for the one or more historical data and metrical data points for the tradable item employing a particular strategy.

According to some exemplary embodiments, dropping and marking of the neural network as unusable may include disposing of the neural network and the neural network usable data set, and reporting to the data provider that the neural network has failed.

If the error rate does converge, the neural network is saved and marked as "usable."

At step 109, the saved usable neural network is tested against updated historical and metrical data set. According to some embodiments, an updated historical and metrical data set comprises historical and metrical data collected since the time the virtual machine created the neural network at step 105.

At step 110, for each time-frame in the updated historical and metrical data, the neural network is retrained until it stops converging. In various exemplary embodiments, retraining may include using the updated historical and metrical data as new inputs to the neural network for it to create an updated learning pattern.

For example, in the facial recognition example from above, giving the neuro network a new set of faces (i.e. data points) will allow the neural network to learn, classify, and update its knowledge of facial characteristics.

For example, referring to step 107, when the actual trading day profit produced by using a particular trading strategy in gold comprised $300, $325, $350 for a sequence of trading days, and the trading day profit was predicted to be $375 for the next trading day, and when the actual profit turned out to be $365, the neural network base may be retrained to lower its future expectations. Accordingly, the error rate will for the retrained neural network will be observed for convergence patterns as discussed herein.

At step 111, the neural network is saved with the one or more data points as a binary object. According to certain exemplary embodiments, a binary object may be defined as digital data stored in any unspecified format.

An example of performing step 111 may comprise generating an output of information and storing it digitally as a .jpg, .exe, .nc, .wav, .tar or otherwise known digital format.

At step 112, each virtual machine transmits the binary object to the historical server.

At step 113, a fusion server activates the neural network as stored in the historical server as the binary object.

In various exemplary embodiments, a fusion server may comprise a set of algorithms and/or databases, which reside on one server machine that is designed to select, access, and then combine sets of information from multiple neuro networks.

Activating a neural network, in certain exemplary embodiments, includes accessing a specific neuro network for components such as its input data, test values, stored weights, and other needed data items.

An example of performing step 113 may comprise accessing a neuro network for its internally stored weighted values.

At step 114, the neural network obtains updated historical and/or metrical data from the historical server.

In various exemplary embodiments, updated historical and/or metrical data is defined as data or data sets that exist externally to the historical server. According to other exemplary embodiments, updated historical and/or metrical data is historical data and/or metrical data obtained after the neural network was saved as a binary object at step 111.

At step 115, the neural network calculates a confidence value based upon the updated historical and/or metrical data.

In certain exemplary embodiments, a confidence value may be defined as a real number in the interval set of [0, 1] where 0 indicates no confidence and 1 indicates perfect confidence.

The calculation of the confidence value, according to some exemplary embodiments, is performed by the neural network base.

An example of performing step 115 includes a Strategy 1 receiving a confidence value of 1 indicating trading confidence, so it will be considered as a component in a basket to be allocated trading capital on the next available trading session. In contrast, Strategy 2 received a confidence value of 0 indicating no trading confidence, so it will not be considered as a component in a basket to be allocated trading capital on the next trading available session.

At step 116, the Fusion server obtains the calculated confidence value and determines whether to execute a trade.

According to various exemplary embodiments, the Fusion server accesses the calculated confidence value through activation of the neuro network.

Determining whether to execute a trade, according to some exemplary embodiments, is performed by algorithmic calculations performed by the Fusion server.

An example of performing step 116 includes the fusion server changing a trading strategy's exposure from FLAT to LONG when the activated output is high enough.

At step 117, the Fusion server performs a survey.

According to some exemplary embodiments, the survey comprises selecting a tradable item, determining a net position based on each position for the tradable item, and determining a percentage for the net position based on the total of all positions.

For example, assume the tradable item or market is gold. A trader has a maximum of 10 contracts (or investable units, shares, etc. not limited to futures contracts) that he or she may invest in the gold market. Presently, the trader has 30 contracts that are long (Buy) in the gold market and 70 contracts that are short (Sell) in the gold market. Accordingly, the trader's net present position is 40 contracts that are short out of a total of (30+70) 100 contracts, which computes to a survey of 40% short. Each algorithm is not limited to representing 1 contract. Weighting could be different for each bot, but the net result of the basket survey (Longs+ Shorts) is still the same.

At step 118, the Fusion server compares the survey against the maximum number of contracts that the trader may invest in the tradable time to determine an order to send to an exchange.

For example, with reference to step 118, the survey is 40% short with a maximum of 10 contracts that may be invested in the gold market. Accordingly, the current account position in Gold is compared with the expected position in Gold (−4). The automated order management system (Fusion Server) will send an order to the exchange to bring the account position in Gold to (Short) −4 contracts. For example, the account position in Gold was Long 2 contracts. The Gold market suddenly moves down in price. This move triggered some of the algorithms to switch their signals from Long to Short, therefore changing the net result of the basket. The new survey reveals a 40% short position, and the maximum contracts to be traded in Gold is 10 contracts. The account must be adjusted to the current survey of 40% short, which is Short 4 or −4. If the account was Long 2 and it should now be Short 4, the Fusion Server will send an order to the exchange to Sell 6 Gold contracts (Sell 2 to bring the position to 0 from long 2, then Sell 4 more to bring the account position to −4 in Gold).

At step 119, the real time trading server is updated to reflect execution of the sent order to the exchange.

For example, with reference to steps 117 and 118 above, after the purchase of 4 contracts that are short in the gold market, the real time trading server will be updated to reflect the purchase and a new total position of 74 contracts that are short in the gold market.

Figure 2:
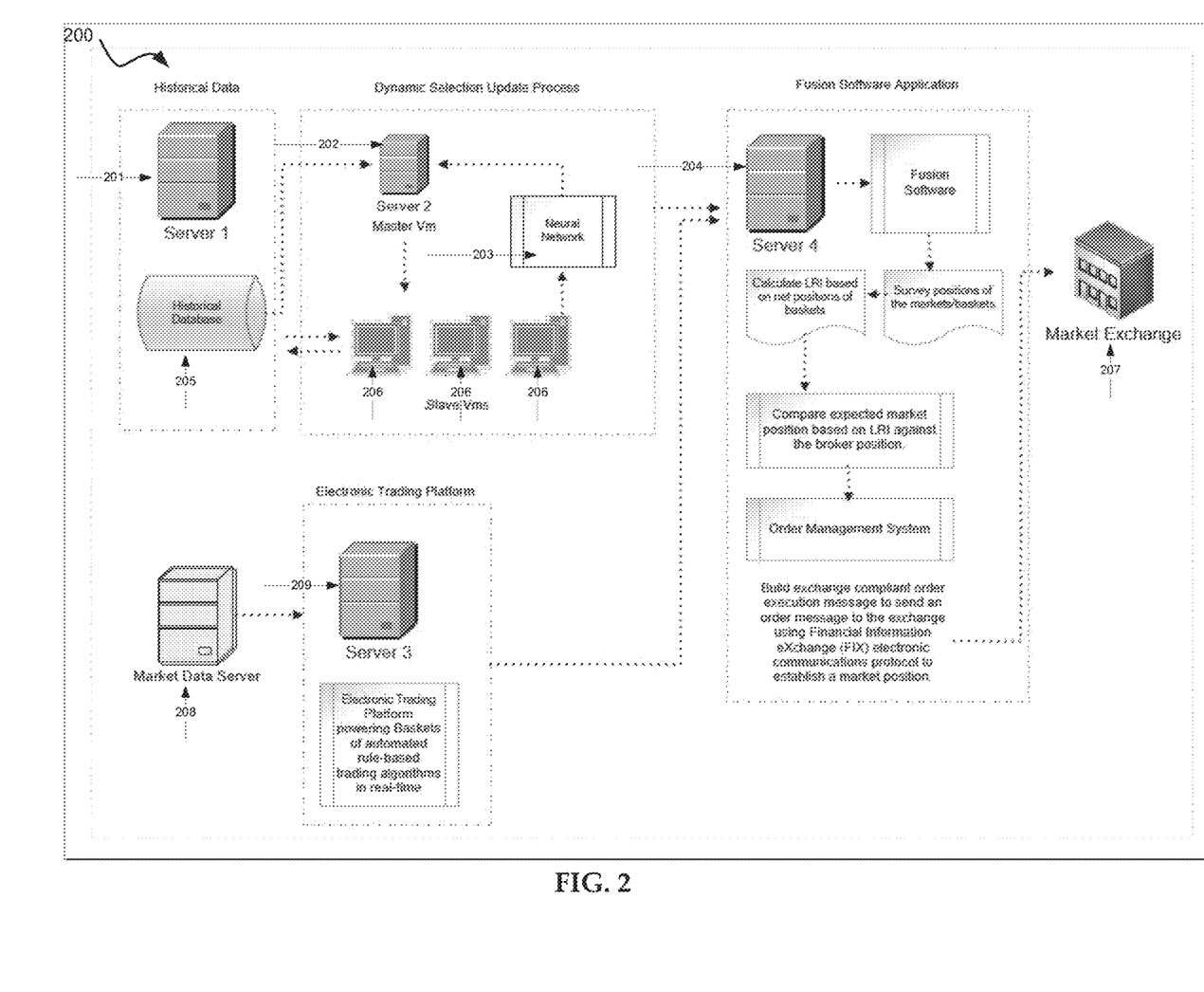
FIG. 2 is a diagram of an exemplary system for implementing embodiments of the present technology.

FIG. 2 is a diagram of an exemplary system 200 for implementing embodiments of the present technology.

Shown in FIG. 2 are historical server 201, master virtual machine server 202, neural network 203, fusion server 204, historical database 205, virtual machines 206, market exchange 207, market data server 208 and real time trading server 209.

According to various exemplary embodiments, a virtual machine 206 is generated by a master virtual machine server 202 for a trading strategy in a historical server 201. Each virtual machine 206 generated obtains historical performance data for its respective strategy from the historical server 201. Each virtual machine 206 transforms the historical performance data into metrical data. Each virtual machine 206 transforms the historical performance data and metrical data into a neural network usable data set. Each virtual machine 206 creates a neural network base. The neural network base, along with the neural network usable data set forms a neural network 203. Each virtual machine 206 trains its respective neural network 203 (and the neural network learns) for one or more data points. An error rate for the one or more data points is determined and observed by each virtual machine 206 until the error rate stops converging or cannot converge. If the observed error rate does not converge, the neural network 203 is dropped and marked as "unusable" for the one or more historical data and metrical data points for the tradable item employing a particular strategy. If the observed error rate converges, the neural network 203 is saved and marked as "usable." The saved usable neural network 203 is tested against an updated historical and metrical data set. For each time-frame in the updated historical and metrical data, the neural network 203 is retrained until it stops converging. The neural network 203 is saved with the one or more data points as a binary object. Each virtual machine 206 transmits the binary object to the historical server 201. A fusion server 204 activates the neural network 203 as stored in the historical server 201 as the binary object. The neural network 203 obtains updated historical and/or metrical data from the historical server 201. The neural network 203 calculates a confidence value based upon the updated historical and/or metrical data. The fusion server 204 obtains the calculated confidence value and determines whether to execute a trade. The fusion server 204 performs a survey. The fusion server 204 compares the survey against the maximum number of contracts that the trader may invest in the tradable time to determine an order to send to the market exchange 207. The real time trading server 209 is updated to reflect execution of the sent order to the market exchange 207.

The exemplary systems and methods described herein may be performed in a secure computing environment including the use of firewalls and encryption technology. Given the potentially high value of the information being generated, and the potential magnitude of the resulting investment decisions, measures may be taken to perform some or all of the steps herein in a secure manner, with emphasis on such steps as the determination of strategy and execution of trades. For example, in addition to an optimal strategy, non-optimal strategies may purposely be added in the same string or digital data environment of the optimal strategy to confuse any unwanted hackers intercepting such information. As another example, in addition to a desired trade to be executed, undesired trades may purposely be added in the same string or digital data environment of the desired trade to confuse any unwanted hackers intercepting such information. Further, the desired trade may receive funding for execution, whereas the undesired trades may not receive funding for execution.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A method for allocating capital to trading strategies comprising:

generating a virtual machine for a trading strategy;

obtaining historical performance data for the trading strategy;

transforming by the virtual machine the historical performance data into metrical data;

transforming by the virtual machine the historical performance data and metrical data into a neural network usable data set;

creating by the virtual machine a neural network base;

forming by the virtual machine a neural network;

training by the virtual machine the neural network for one or more data points; and calculating by the virtual machine an error rate for the one or more data points until the error rate stops converging or cannot converge.

2. The method of claim 1, further comprising saving by the virtual machine the neural network.

3. The method of claim 2, further comprising testing by the virtual machine the saved neural network against updated metrical and historical data.

4. The method of claim 2, further comprising training by the virtual machine the saved neural network.

5. The method of claim 1, further comprising saving by the virtual machine the neural network as a binary object.

6. The method of claim 5, further comprising transmitting by the virtual machine the binary object to a historical server.

7. The method of claim 1, further comprising activating by a fusion server the neural network.

8. The method of claim 7, further comprising obtaining by the fusion server the historical metrical and the historical performance data.

9. The method of claim 8, further comprising calculating by the fusion server a confidence value.

10. The method of claim 8, further comprising determining by the fusion server whether to execute a trade.

11. The method of claim 10, further comprising performing by the fusion server a survey.

12. The method of claim 11, further comprising determining by the fusion server an order to send to an exchange.

13. The method of claim 12, further comprising sending by the fusion server the order to the exchange.

14. The method of claim 13, further comprising updating by the fusion server to reflect an executed order.

15. A system for allocating capital to trading strategies comprising:

a means for generating a virtual machine for a trading strategy;

a means for obtaining historical performance data for the trading strategy;

a means for transforming the historical performance data into metrical data;

a means for transforming the historical performance data and metrical data into a neural network usable data set;

a means for creating a neural network base;

a means for forming a neural network;

a means for training the neural network for one or more data points; and a means for testing a saved neural network against updated metrical and historical data.

16. The system of claim 15, further comprising a means for training the saved neural network.

17. The system of claim 15, further comprising a means for saving the neural network as a binary object.

18. The system of claim 17, further comprising a means for transmitting the binary object to a historical server.

19. The system of claim 15, further comprising a means for activating the neural network.

20. The system of claim 15, further comprising a means for obtaining the historical metrical and the historical performance data.

* * * * *